United States Patent
Xu et al.

(10) Patent No.: US 10,200,187 B2
(45) Date of Patent: Feb. 5, 2019

(54) METHODS AND SYSTEMS FOR DISSIPATING HEAT IN OPTICAL COMMUNICATIONS MODULES

(71) Applicant: Avago Technologies International Sales Pte. Limited, Singapore (SG)

(72) Inventors: Hui Xu, Santa Clara, CA (US); Sanjeev Gupta, Santa Rosa, CA (US); Bob Ritter, Los Altos, CA (US)

(73) Assignee: AVAGO TECHNOLOGIES INTERNATIONAL SALES PTE. LIMITED, Singapore (SG)

( * ) Notice: Subject to any disclaimer, the term of this patent is extended or adjusted under 35 U.S.C. 154(b) by 240 days.

(21) Appl. No.: 15/078,827

(22) Filed: Mar. 23, 2016

(65) Prior Publication Data

US 2017/0280550 A1    Sep. 28, 2017

(51) Int. Cl.
*H04B 10/00*    (2013.01)
*H04L 7/00*    (2006.01)

(52) U.S. Cl.
CPC ........... *H04L 7/0079* (2013.01); *H04B 10/00* (2013.01)

(58) Field of Classification Search
CPC ...... H04B 10/40; H04B 10/801; H04B 10/25; H04B 10/50; H04B 10/00; H05K 1/0203; H05K 7/20409; H05K 7/20436; H04L 7/0075; H04L 7/0079; H01L 2924/3025; H01L 2924/14; G02B 6/4201; G02B 6/428; G02B 6/4256; G02B 6/4269; G02B 6/4278; G02B 6/4293; G02B 6/4271; G02B 6/4281; G02B 6/4245; G02B 6/42; G02B 6/4246; G02B 6/4284; G02B 6/4268; G02B 6/12004; G02B 6/1203

USPC .......................... 398/135, 139, 155, 164, 138
See application file for complete search history.

(56) References Cited

U.S. PATENT DOCUMENTS

| | | | | |
|---|---|---|---|---|
| 6,804,116 B2 * | 10/2004 | Owens | ................ | G02B 6/293 165/104.26 |
| 6,822,860 B2 * | 11/2004 | Owens | ................ | G02B 6/293 165/104.33 |
| 7,031,612 B2 * | 4/2006 | Liou | ................ | H04B 10/40 372/40 |
| 7,583,900 B2 | 9/2009 | Dallesasse et al. | | |

(Continued)

FOREIGN PATENT DOCUMENTS

WO    2013099497 A1    7/2013

OTHER PUBLICATIONS

Machine translation of WO2013099497, published Jul. 4, 2013.

*Primary Examiner* — Hibret Woldekidan
(74) *Attorney, Agent, or Firm* — Sheridan Ross P.C.

(57) ABSTRACT

In an optical communications system, the thermal pathway for dissipating heat generated by clock and data recovery (CDR) circuitry of an optical communications module is a separate from the thermal pathway that is used to dissipate heat generated by other components of the module. The CDR circuitry is external to the module and is provided with its own heat dissipation device. Keeping the CDR circuitry external to the module and providing it with its own heat dissipation device decouples the thermal pathway for dissipating heat generated by the CDR circuitry from the thermal pathways used for dissipating heat generated by other components of the module. This results in more effective heat dissipation and better component performance.

22 Claims, 7 Drawing Sheets

(56) References Cited

U.S. PATENT DOCUMENTS

| | | | |
|---|---|---|---|
| 7,796,885 B2* | 9/2010 | Dress | H04B 10/803 |
| | | | 398/118 |
| 8,731,347 B2* | 5/2014 | Chan | G02B 6/4204 |
| | | | 385/14 |
| 9,052,484 B2 | 6/2015 | McColloch et al. | |
| 9,063,305 B2* | 6/2015 | McColloch | H05K 7/20409 |
| 9,856,769 B2* | 1/2018 | Baker | F01N 3/0857 |
| 2006/0126309 A1* | 6/2006 | Bolle | H05K 7/20436 |
| | | | 361/719 |
| 2011/0207344 A1* | 8/2011 | McColloch | G02B 6/3885 |
| | | | 439/78 |
| 2013/0287404 A1* | 10/2013 | McColloch | G02B 6/428 |
| | | | 398/135 |
| 2014/0179129 A1* | 6/2014 | Chan | H01R 12/7029 |
| | | | 439/78 |
| 2014/0286646 A1 | 9/2014 | Zbinden et al. | |
| 2016/0291270 A1* | 10/2016 | Wang | G02B 6/4277 |
| 2017/0066088 A1* | 3/2017 | Sood | H05K 3/363 |

* cited by examiner

METHODS AND SYSTEMS FOR DISSIPATING HEAT IN OPTICAL COMMUNICATIONS MODULES

TECHNICAL FIELD OF THE INVENTION

The invention relates to optical communications modules. More particularly, the invention relates to heat dissipation systems and methods used in optical communications modules.

BACKGROUND OF THE INVENTION

A variety of parallel optical communications modules exist for simultaneously transmitting and/or receiving multiple optical data signals over multiple respective optical data channels. Parallel optical transmitters have multiple optical transmit channels for transmitting multiple respective optical data signals simultaneously over multiple respective optical waveguides (e.g., optical fibers). Parallel optical receivers have multiple optical receive channels for receiving multiple respective optical data signals simultaneously over multiple respective optical waveguides. Parallel optical transceivers have multiple optical transmit and receive channels for transmitting and receiving multiple respective optical transmit and receive data signals simultaneously over multiple respective transmit and receive optical waveguides.

For each of these different types of parallel optical communications modules, a variety of designs and configurations exist. A typical layout for a parallel optical communications module includes a circuit board, such as a printed circuit board (PCB), a ball grid array (BGA), or the like, on which various electrical components and optoelectronic components (i.e., laser diodes and/or photodiodes) are mounted. In the case of a parallel optical transmitter, laser diodes and one or more laser diode driver integrated circuits (ICs) are mounted on the circuit board. The circuit board has electrical conductors running through it (i.e., electrical traces and vias) and electrical contact pads on it. The electrical contact pads of the laser diode driver IC(s) are electrically connected to the electrical conductors of the circuit board. One or more other electrical components, such as a controller IC, for example, are typically also mounted on and electrically connected to the circuit board.

Similar configurations are used for parallel optical receivers, except that the circuit board of the parallel optical receiver has a plurality of photodiodes instead of laser diodes mounted on it and a receiver IC instead of a laser diode driver IC mounted on it. Parallel optical transceivers typically have laser diodes, photodiodes, one or more laser diode driver ICs, and a receiver IC mounted on it, although one or more of these devices may be integrated into the same IC to reduce part count and to provide other benefits.

The circuit board typically has one or more heat sink devices mounted on the upper surface thereof. The heat sink devices are typically made of materials of good thermal conductivity (e.g., metal), and are attached to heat generating components with thermal pads. The heat sink devices can have various shapes. The electrical and optoelectronic components are typically attached by a thermally conductive material to these heat sink devices to enable heat generated by them to pass into and be dissipated by the heat sink devices. A heat sink device is also typically attached to the top of the module. Heat sink devices all have the same general purpose of receiving heat generated by the respective components and absorbing and/or spreading out the heat to move it away from the components. Heat generated by the components can detrimentally affect the performance of the parallel optical communications module.

There is an ever-increasing need to increase the number of channels of parallel optical communications modules and the speed at which they operate. In order to meet these needs, heat dissipation devices need to be practical in terms of space utilization and highly effective at dissipating heat. As the number of channels increases, the number of components that generate heat also increases. At the same time, implementing adequate heat dissipation solutions becomes even more difficult due to the higher density of components in a smaller area.

Accordingly, a need exists for methods and systems that provide improvements in heat dissipation and that are efficient in terms of space utilization.

DETAILED DESCRIPTION OF AN ILLUSTRATIVE EMBODIMENT

In accordance with illustrative embodiments described herein, the thermal pathway for dissipating heat generated by clock and data recovery (CDR) circuitry is separate from the thermal pathway that is used to dissipate heat generated by other components of the optical communications module. CDR circuitry used in high-speed parallel optical communications modules consumes a lot of power and therefore generates a lot of heat. In accordance with illustrative embodiments described herein, the CDR circuitry is kept external to the parallel optical communications module and is provided with its own heat dissipation device. Keeping the CDR circuitry external to the module and providing it with its own heat dissipation device allows the thermal pathway used for dissipating heat generated by the CDR circuitry to be decoupled from the thermal pathways used for dissipating heat generated by other components of the module, which results in more effective heat dissipation and better component performance. Illustrative embodiments will now be described with reference to FIGS. 1-6, in which like reference numerals represent like components, features or elements.

Figure 1:
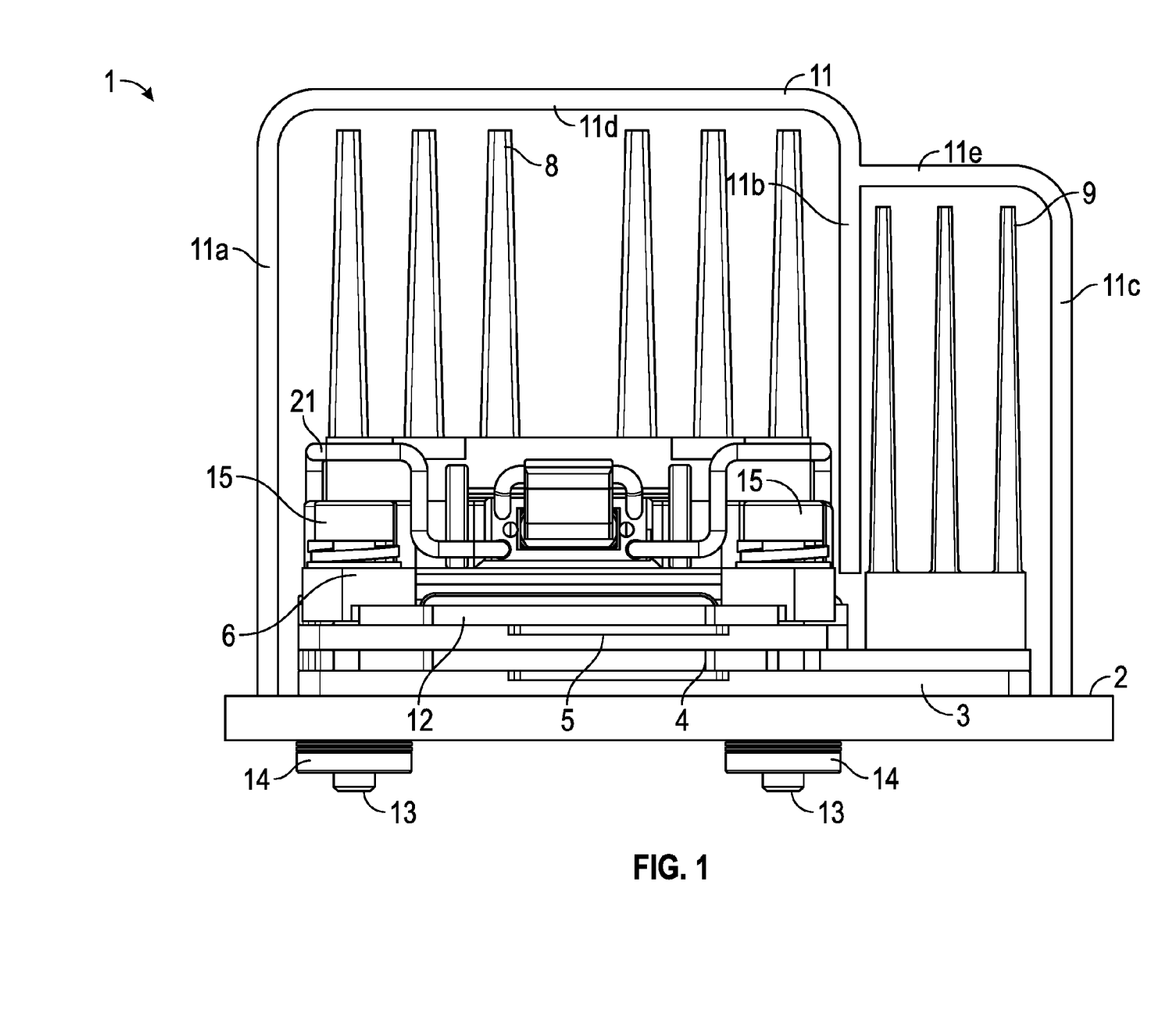
FIG. 1 illustrates a side plan view of an optical communications system in accordance with an illustrative embodiment.
Figure 2:
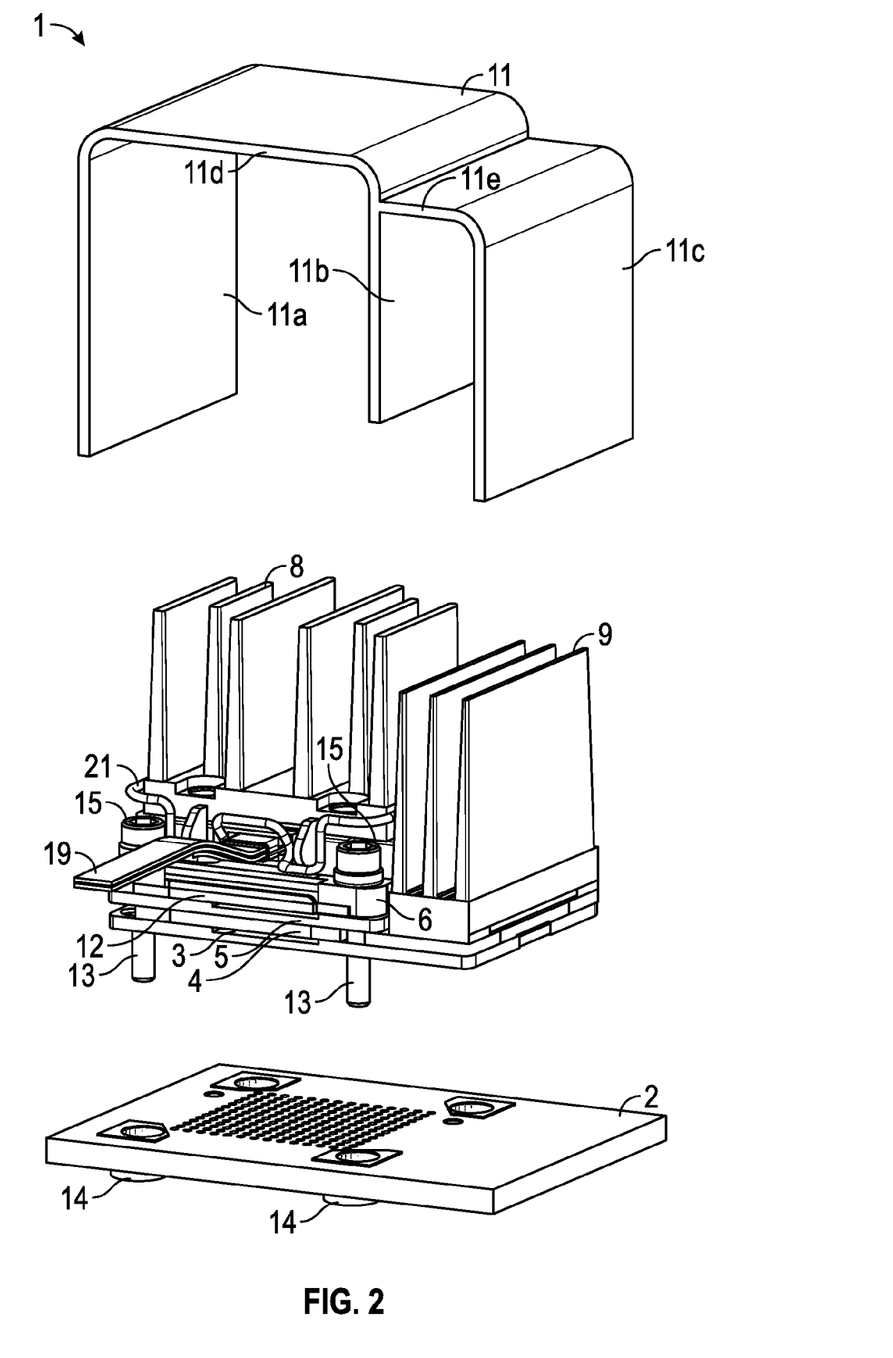
FIG. 2 illustrates a partially exploded side plan view of the optical communications system shown in FIG. 1.
Figure 3:
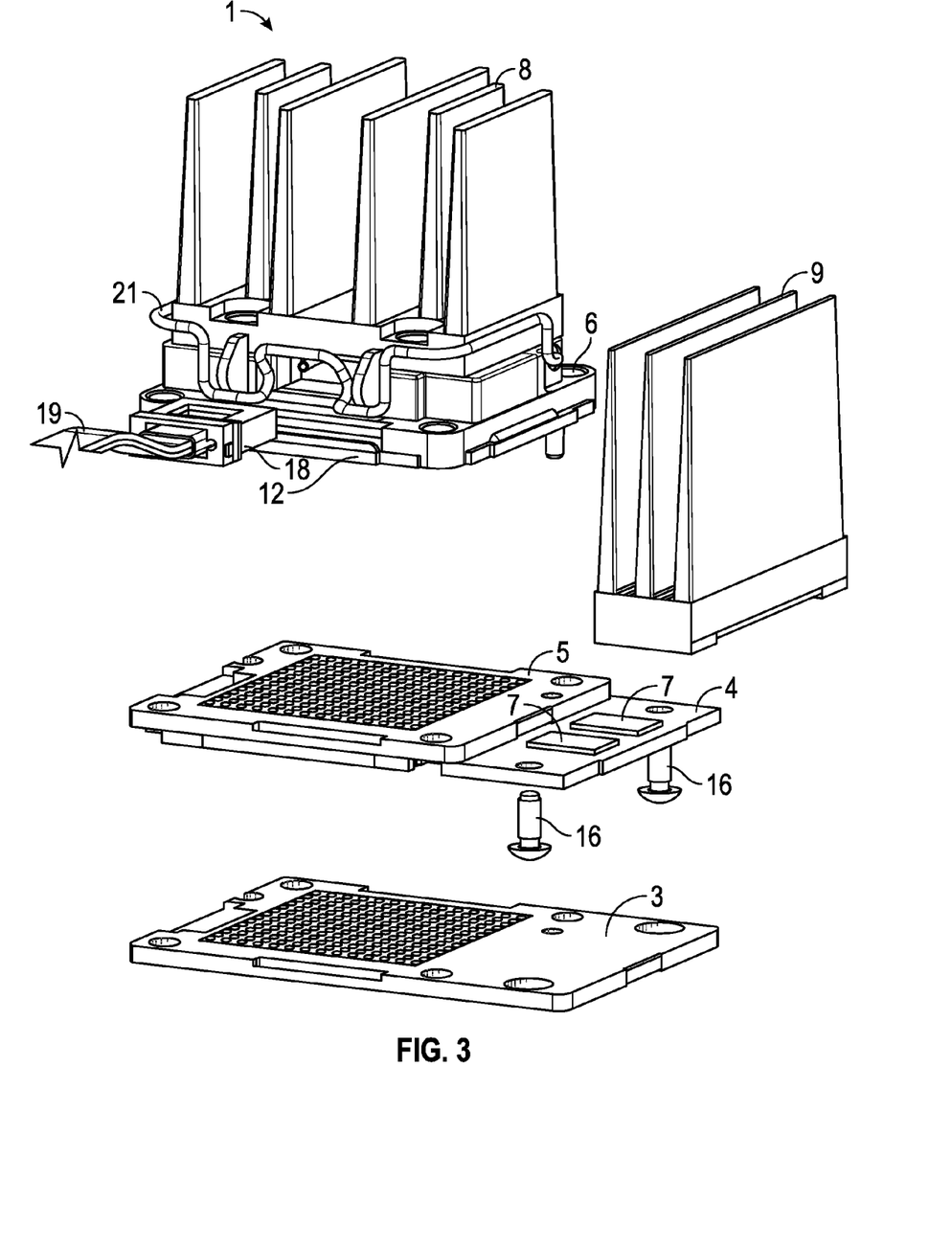
FIG. 3 illustrates a fully exploded side plan view of the optical communications system shown in FIG. 1.

FIG. 1 illustrates a side plan view of an optical communications system 1 in accordance with an illustrative embodiment. FIG. 2 illustrates a partially exploded side plan view of the optical communications system 1 shown in FIG. 1. FIG. 3 illustrates a fully exploded side plan view of the optical communications system 1 shown in FIG. 1. The system 1 includes a first surface-mount structure 2, which is typically a PCB, a second surface-mount structure 3, which is typically a land grid array (LGA), a third surface-mount structure 4, which is typically an interposer substrate, a fourth surface-mount structure 5, which is typically an LGA, a parallel optical communications module 6 mounted on the fourth surface-mount structure 5, CDR circuitry 7 mounted on the third surface-mount structure 4, first and second heat sink devices 8 and 9, respectively, secured to the module 6 and to the CDR circuitry 7, respectively, and a baffle 11 secured to the first surface-mount structure 2. The first surface-mount structure 2 is not shown in FIG. 3 for ease of illustration.

The module 6 has a module surface-mount device 12, which is typically a PCB that interfaces with the fourth surface-mount structure 5. Fastening devices 13-16 (e.g., pins or screws and nuts) are used to fasten the module 6 and the surface-mount structures 2-5 to one another. The heat sink devices 8 and 9 and the baffle 11 may be secured in position using, for example, screws or a thermally-conductive epoxy (not shown).

The module 6 has N channels, where N is a positive integer that is greater than or equal to 2. In accordance with an illustrative embodiment, the module 6 is a duplex optical transceiver module in that each channel simultaneously transmits and receives a data signal. Therefore, the module 6 has N light sources, which are typically laser diodes, and N optical detectors, which are typically P-intrinsic-N (PIN) diodes. In accordance with an illustrative embodiment, the module 6 uses a modulation scheme known as pulse amplitude modulation (PAM)-4 to transmit and receive data signals at a data rate of at least 25 Gigabits per second (Gbps).

When the system 1 is fully assembled as shown in FIG. 1, the CDR circuitry 7, which in this embodiment is an IC chip, is external to the module 6. Heat generated by the CDR circuitry 7 passes into the heat sink device 9. Heat generated by the electrical and optoelectronic components (e.g., driver IC, laser diodes, etc.) of the module 6 passes into the heat sink device 8. The baffle 11 has vertical walls 11a, 11b and 11c and horizontal walls 11d and 11e. The vertical walls 11a and 11b and the horizontal wall 11d define a first convective pathway across the first heat sink device 8. The vertical walls 11b and 11c and the horizontal wall 11e define a second convective pathway across the second heat sink device 9. Convective cooling of the system 1 is performed by forcing air through the baffle 11 to cool the heat sink devices 8 and 9. Because the CDR circuitry 7 is external to the module 6, has its own heat sink device 9 and has its own convective cooling pathway due to the design of the baffle 11, the heat dissipation pathways of the module 6 and of the CDR circuitry 7 are thermally decoupled from one another. This thermal decoupling ensures that the temperatures of the module 6 and of the CDR circuitry 7 remain at or below desired operating temperatures, thereby ensuring that performance of the module 6 and of the CDR circuitry 7 will not be adversely affected by heat.

The module 6 is not limited to being any particular type of parallel optical communications module, except that it is designed for mounting in the plane of a surface-mount device, such as an LGA or a PCB. Modules that mount in the plane of such surface-mount devices are sometimes referred to as embedded modules or mid-plane-mounted modules. The module 6 shown in FIGS. 1-3 is adapted to mate with a connector 18 disposed on an end of a multi-optical fiber cable 19, such as an optical fiber ribbon cable. The module 6 includes a bail 21 that can be placed in a latched state to lock the connector 18 to the module 6 or in an unlatched state to allow the connector 18 to be disconnected from the module 6.

Each of the surface-mount structures 2-5 and 12 has an array of electrical contacts disposed on its top surface and an array of electrical contacts disposed on its bottom surface. Electrical contacts of the array of electrical contacts disposed on the top surface of the first surface-mount structure 2 are in contact with respective electrical contacts of the array that is disposed on the bottom surface of the second surface-mount structure 3. Electrical contacts of the array of electrical contacts disposed on the top surface of the second surface-mount structure 3 are in contact with respective electrical contacts of the array that is disposed on the bottom surface of the third surface-mount structure 4. Electrical contacts of the array of electrical contacts disposed on the top surface of the third surface-mount structure 4 are in contact with respective electrical contacts of the array that is disposed on the bottom surface of the fourth surface-mount structure 5. Electrical contacts of the array of electrical contacts disposed on the top surface of the fourth surface-mount structure 5 are in contact with respective electrical contacts of the array that is disposed on the bottom surface of the surface-mount structure 12 of the module 6. The surface-mount structures 2-5 and 12 have electrical conductors, or traces, disposed on or in them and typically have electrical vias passing through them.

The CDR circuitry 7 performs clock and data recovery, also referred to sometimes as retiming operations. CDR circuits are sometimes referred to in the industry as retimer circuits, or simply as retimers. Because CDR circuits are well known in the art, a detailed discussion of the operations that are performed by the CDR circuitry 7 will not be provided herein in the interest of brevity. Because the module 6 uses a PAM-4 modulation scheme in accordance with an illustrative embodiment, the CDR circuitry 7 performs PAM-4 clock and data recovery operations.

In addition to facilitating heat dissipation, locating the CDR circuitry 7 outside of the module 6 provides additional benefits. One benefit is that it reduces the complexity of the system surface-mount structure 2. The density of high-speed circuit elements on the first surface-mount structure 2 is reduced. The first surface-mount structure 2 only handles high-speed signal routing for the electrical input/output (I/O) interface of the module 6, whereas the third surface-mount structure 4 handles all of the high-speed signal routing associated with the interface between the optoelectronic element chip (e.g., the laser diode array chip) and the channel circuitry of the module 6. Also, the use of the surface-mount structures 2-5 allows each component to be individually tested prior to final system integration.

Figure 4:
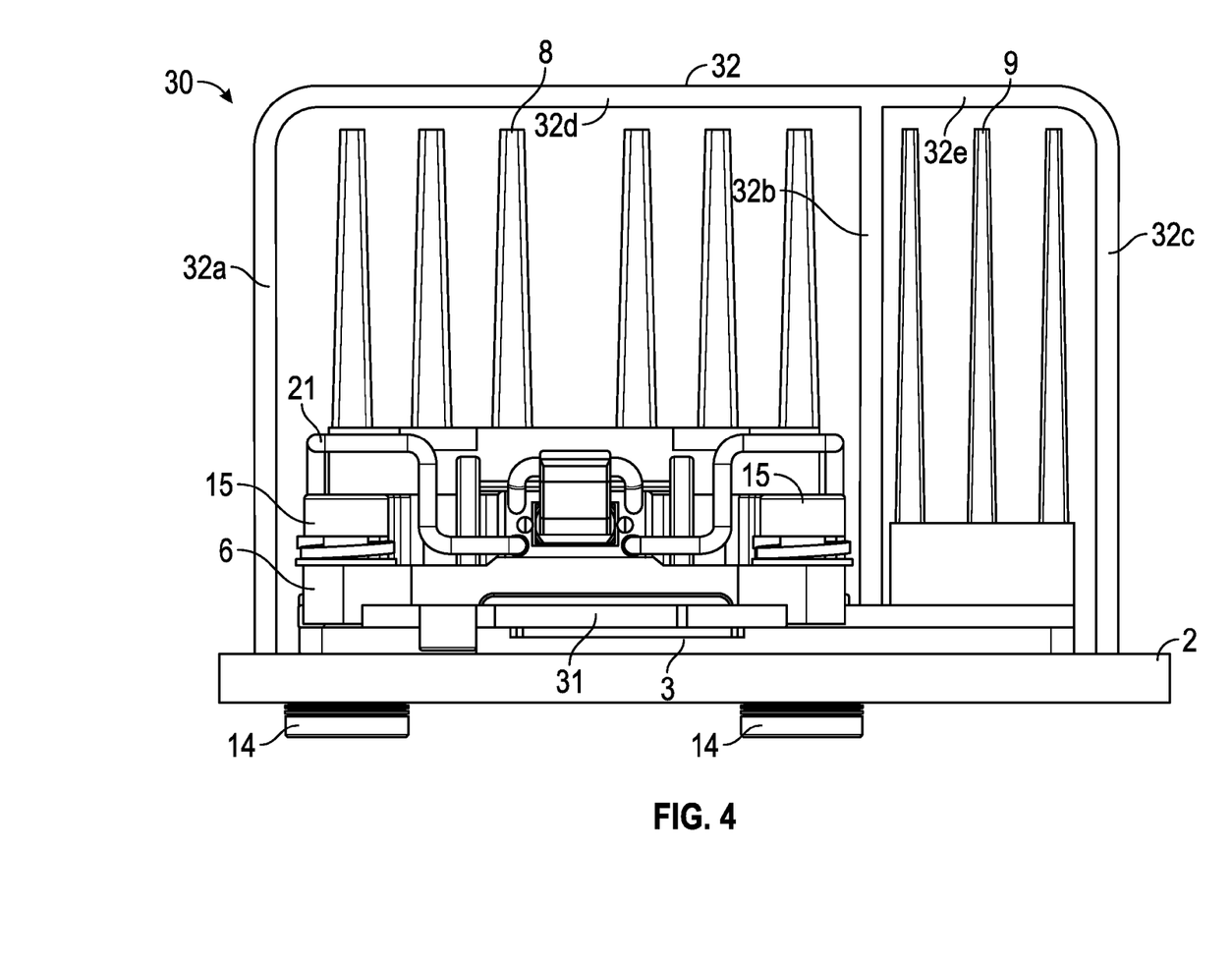
FIG. 4 illustrates a side plan view of an optical communications system in accordance with another illustrative embodiment.
Figure 5:
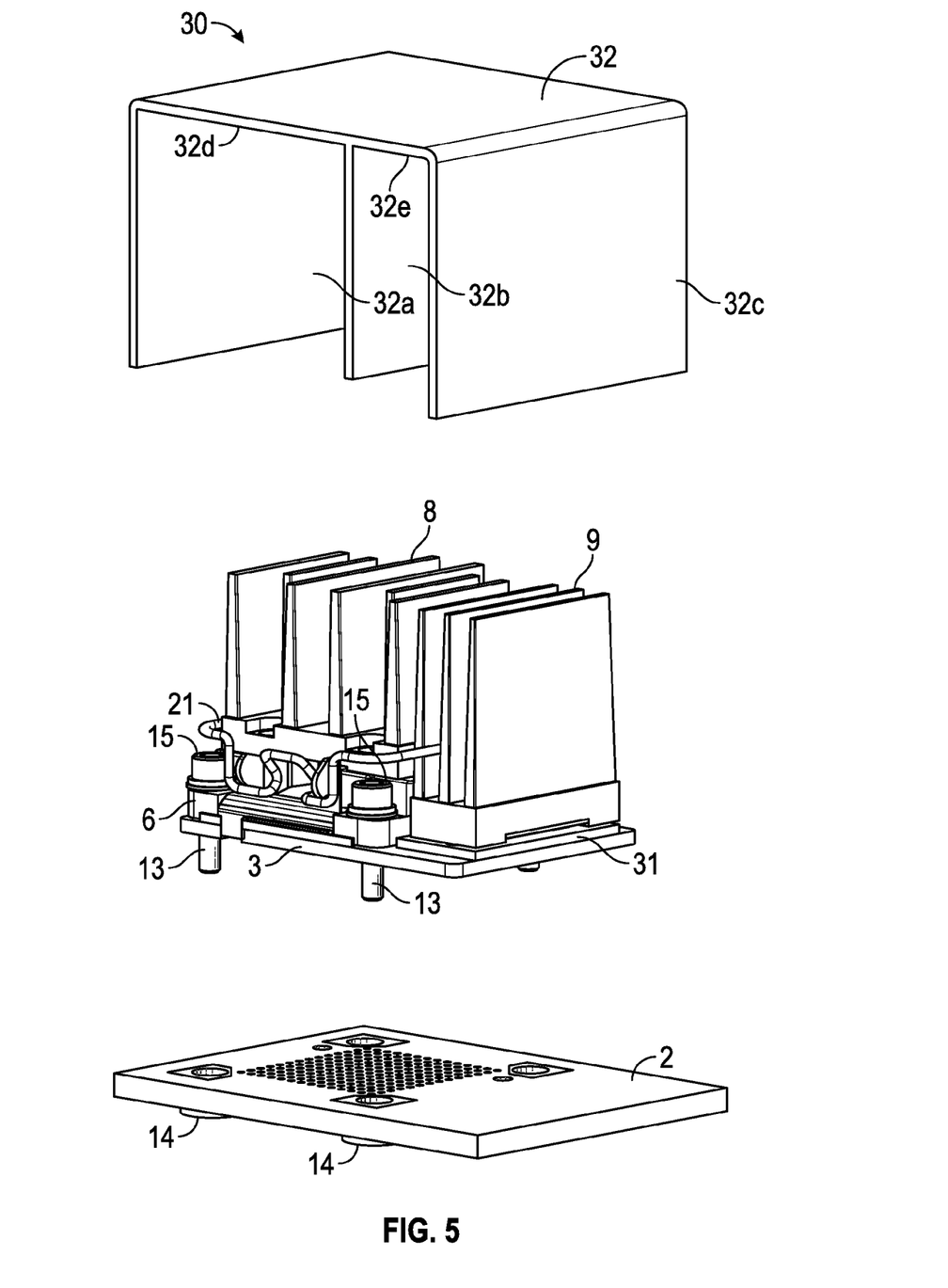
FIG. 5 illustrates a partially exploded side plan view of the optical communications system shown in FIG. 4.
Figure 6:
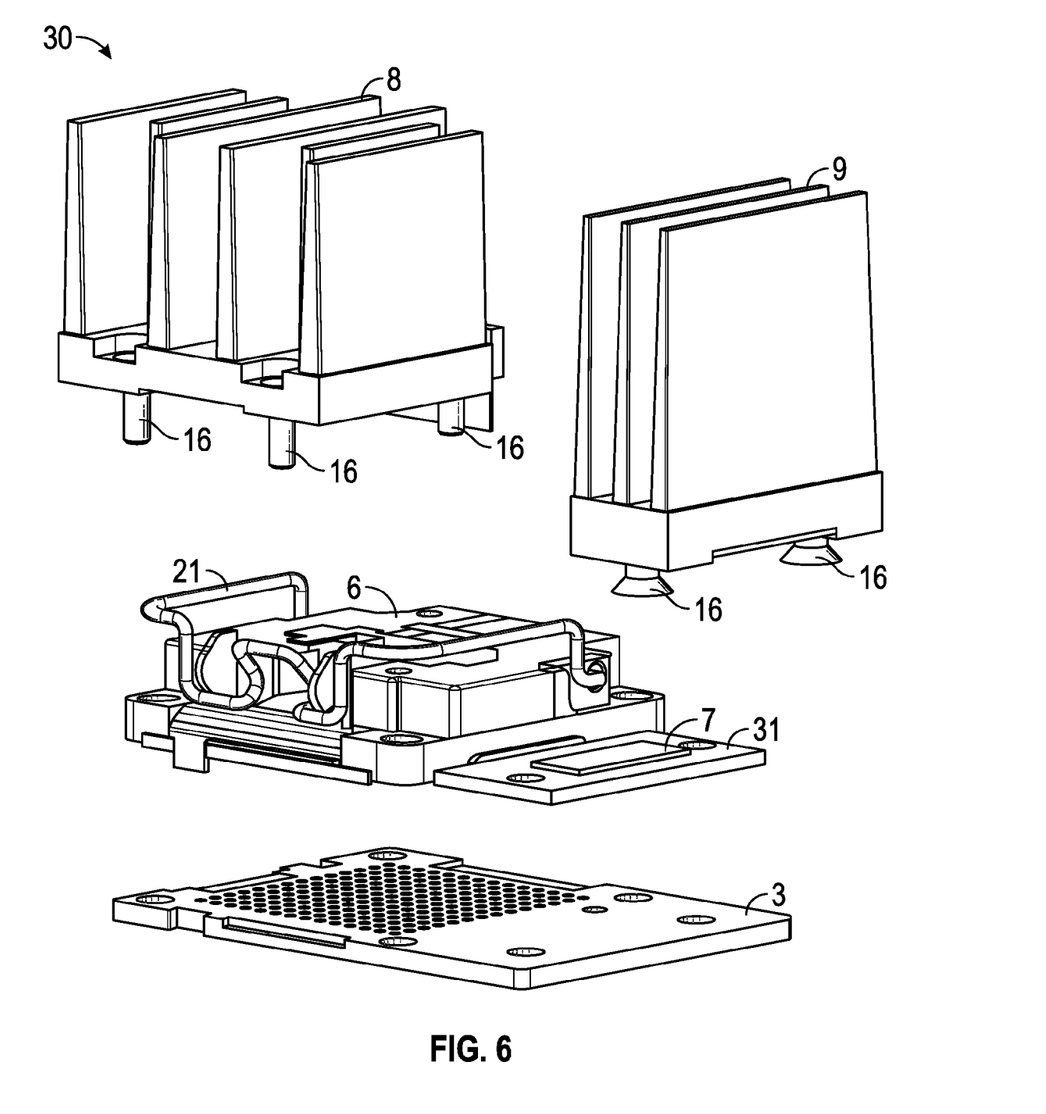
FIG. 6 illustrates a fully exploded side plan view of the optical communications system shown in FIG. 4.

FIG. 4 illustrates a side plan view of an optical communications system 30 in accordance with an illustrative embodiment. FIG. 5 illustrates a partially exploded side plan view of the optical communications system 30 shown in FIG. 4. FIG. 6 illustrates a fully exploded side plan view of the optical communications system 30 shown in FIG. 4. The system 30 shown in FIGS. 4-6 is similar to the system 1 shown in FIGS. 1-3 except that the system 30 uses a reduced number of surface-mount structures compared to the number of surface-mount structures used in system 1. The system 30 includes the first surface-mount structure 2, which is typically a PCB, a second surface-mount structure 3, which is typically an LGA, a parallel optical communications module 6 mounted on the second surface-mount structure 3, CDR circuitry 7 mounted on a module surface-mount structure 31, first and second heat sink devices 8 and 9, respectively, secured to the module 6 and to the CDR circuitry 7, respectively, and a baffle 32 secured to the first surface-mount structure 2. The first surface-mount structure 2 is not shown in FIG. 6 for ease of illustration.

The module surface-mount structure 31, which is typically a PCB, interfaces with the second surface-mount structure 3. The module surface-mount structure 31 extends for a distance outside of the module 6 to provide a mounting region for mounting the CDR circuitry 7 thereon. The baffle 32 is similar, but not identical to the baffle 11. The baffle 32 has vertical walls 32*a*, 32*b* and 32*c* and horizontal walls 32*d* and 32*e*. The vertical walls 32*a* and 32*b* and the horizontal wall 32*d* define a first convective pathway across the first heat sink device 8. The vertical walls 32*b* and 32*c* and the horizontal wall 32*e* define a second convective pathway across the second heat sink device 9. Convective cooling of the system 30 is performed by forcing air through the baffle 32 to cool the heat sink devices 8 and 9. Because the CDR circuitry 7 is external to the module 6, has its own heat sink device 9 and has its own convective cooling pathway due to the design of the baffle 32, the heat dissipation pathways of the module 6 and of the CDR circuitry 7 are thermally decoupled from one another. As indicated above, this thermal decoupling ensures that the temperatures of the module 6 and of the CDR circuitry 7 remain at or below desired operating temperatures, thereby ensuring that performance of the module 6 and of the CDR circuitry 7 will not be adversely affected by heat.

Each of the surface-mount structures 2, 3 and 31 has an array of electrical contacts disposed on its top surface and an array of electrical contacts disposed on its bottom surface. Electrical contacts of the array of electrical contacts disposed on the top surface of the first surface-mount structure 2 are in contact with respective electrical contacts of the array that is disposed on the bottom surface of the second surface-mount structure 3. Electrical contacts of the array of electrical contacts disposed on the top surface of the second surface-mount structure 3 are in contact with respective electrical contacts of the array that is disposed on the bottom surface of the module surface-mount structure 31. The surface-mount structures 2, 3 and 31 have electrical conductors, or traces, disposed on or in them and typically have electrical vias passing through them.

The system 30 has the same benefits as system 1 described above in terms of improved heat dissipation, reduced complexity of the system surface-mount structure 2 and ease of component testing. It should be noted that while the principles and concepts have been described with reference to particular embodiments, many changes can be made to the embodiments within the scope of the invention. For example, the module that is used in the system is not limited to the module 6 shown in the figures. The concepts and principles described herein can be used with any parallel optical communications module. As another example, while certain configurations of surface-mount structures have been used herein to describe principles and concepts, a variety of other surface-mount configurations can be used to achieve the goals of the invention. For example, one or more of the surface-mount structures shown in FIGS. 1-3 may be eliminated without preventing heat dissipation goals described herein from being achieved.

Figure 7:
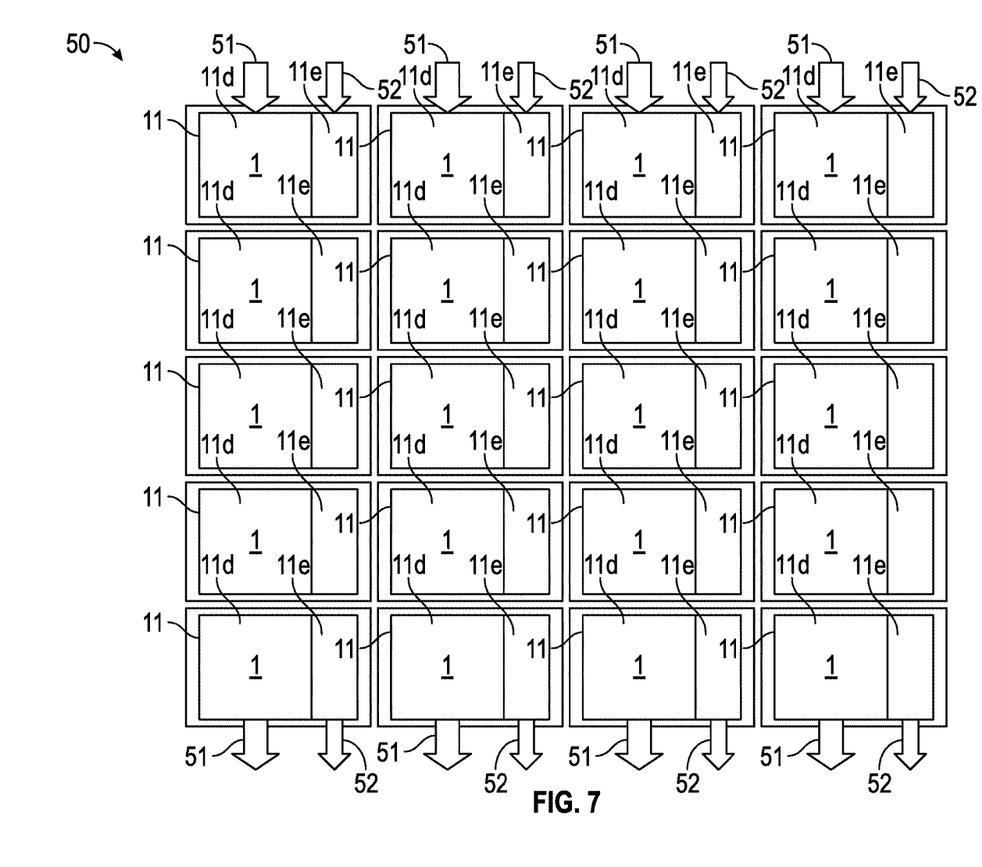
FIG. 7 illustrates a top plan view of an optical communications system comprising an array of the optical communications systems shown in FIGS. 1-3 arranged so that their baffles in each column of the array are aligned.

In order to create a very high density optical communications system using the systems 1 and 30, multiple systems 1 or system 30 can be arranged in an array that allows the convective air pathways for the modules 6 and for the CDR circuitries 7 to remain separate over the entire system. FIG. 7 illustrates a top plan view of an optical communications system 50 comprising an array of the optical communications systems 1 shown in FIGS. 1-3 arranged so that their baffles 11 in each column of the array are aligned. At the top of the array, first and second convective air pathways are represented by arrows 51 and 52. As described above with reference to FIG. 1-3 each of the baffles 11 has vertical walls 11*a*, 11*b* and 11*c* and horizontal walls 11*d* and 11*e*. Only the horizontal walls 11*d* and 11*e* of the baffles 11 are visible in the top plan view shown in FIG. 7. The vertical walls 11*a* and 11*b* (FIG. 1) and the horizontal wall 11*d* define the first convective air pathway 51 across the first heat sink device 8. The vertical walls 11*b* and 11*c* and the horizontal wall 11*e* define the second convective air pathway 52 across the second heat sink device 9.

Convective cooling of the system 1 is performed by forcing air through the baffles 11 in the directions indicated by arrows 51 and 52 to cool the heat sink devices 8 and 9 (FIG. 1). The systems 1 in each column of the array are placed very close to one another to maintain the separation of the first and second convective air pathways 51 and 52 as they flow over the systems 1 so that the first and second convective air pathways 51 and 52 remain separate. As indicated above, this thermal decoupling of the first and second convective air pathways 51 and 52 in conjunction with positioning the CDR circuitry 7 outside of the modules 6 and using the separate heat sink devices 8 and 9 for the module 6 and for the CDR circuitry 7 ensures that the temperatures of the module 6 and of the CDR circuitry 7 remain at or below desired operating temperatures. This, in turn, ensures that performance of the module 6 and of the CDR circuitry 7 will not be adversely affected by heat.

It should be noted that the invention has been described with respect to illustrative embodiments for the purpose of describing the principles and concepts of the invention. The invention is not limited to these embodiments. For example, while the invention has been described with reference to use in parallel optical communications modules, the invention may be used in any optical communications module in which different components have different temperature sensitivities and in which heat dissipation resources are limited. The invention has been described with reference to parallel optical communications modules due to the fact that the increased number of channels and components and the increased demand for smaller module sizes gives rise to more stringent heat dissipation requirements. As will be understood by those skilled in the art in view of the description being provided herein, many modifications may be made to the embodiments described herein while still achieving the goals of the invention, and all such modifications are within the scope of the invention.

What is claimed is:

1. An optical communications system comprising:
a first surface-mount structure having first and second arrays of electrical contacts disposed on top and bottom surfaces thereof, respectively;
clock and data recovery (CDR) circuitry mounted on a first mounting region of the top surface of the first surface-mount structure and having electrical contacts that are in contact with respective electrical contacts of the first array of electrical contacts;
a parallel optical communications module mounted on a second mounting region of the first surface-mount structure, the module including a module surface-mount structure having third and fourth arrays of electrical contacts disposed on top and bottom surfaces thereof, respectively, wherein electrical contacts of the fourth array of electrical contacts are in contact with respective electrical contacts of the first array of electrical contacts; and
a baffle mechanically coupled with the optical communications system, the baffle having walls that define first and second convective air pathways that are thermally decoupled from one another.

2. The optical communications system of claim 1, further comprising:
a first heat sink device mechanically and thermally coupled with the parallel optical communications module; and
a second heat sink device spaced apart from the first heat sink device and being mechanically and thermally coupled with the CDR circuitry.

3. The optical communications system of claim 2, wherein the first convective air pathway flows across the parallel optical communications module and wherein the second convective air pathway flows across the second heat sink device.

4. The optical communications system of claim 3, further comprising:
a system surface-mount structure having fifth and sixth arrays of electrical contacts disposed on top and bottom surfaces thereof, respectively, the first surface-mount structure being mounted on the top surface of the system surface-mount structure, and wherein electrical contacts of the fifth array of electrical contacts are in contact with respective electrical contacts of the second array of electrical contacts.

5. An optical communications system comprising:
a first surface-mount structure having first and second arrays of electrical contacts disposed on top and bottom surfaces thereof, respectively, the first surface-mount structure being a system surface-mount structure;
a second surface-mount structure mounted on the top surface of the first surface-mount structure and having third and fourth arrays of electrical contacts disposed on top and bottom surfaces thereof, respectively, wherein electrical contacts of the fourth array of electrical contacts are in contact with respective electrical contacts of the first array of electrical contacts; and
a third surface-mount structure mounted on the top surface of the second surface-mount structure and having fifth and sixth arrays of electrical contacts disposed on top and bottom surfaces thereof, respectively, wherein electrical contacts of the sixth array of electrical contacts are in contact with respective electrical contacts of the third array of electrical contacts;
clock and data recovery (CDR) circuitry mounted on a first mounting region of the top surface of the third surface-mount structure and having electrical contacts that are in contact with respective electrical contacts of the fifth array of electrical contacts;
a fourth surface-mount structure mounted on a second mounting region of the top surface of the third surface-mount structure and having seventh and eighth arrays of electrical contacts disposed on top and bottom surfaces thereof, respectively, wherein electrical contacts of the eighth array of electrical contacts are in contact with respective electrical contacts of the fifth array of electrical contacts; and
a parallel optical communications module mounted on the forth surface-mount structure, the module including a module surface-mount structure having ninth and tenth arrays of electrical contacts disposed on top and bottom surfaces thereof, respectively, wherein electrical contacts of the tenth array of electrical contacts are in contact with respective electrical contacts of the seventh array of electrical contacts.

6. The optical communications system of claim 5, further comprising:
a first heat sink device mechanically and thermally coupled with the parallel optical communications module; and
a second heat sink device mechanically and thermally coupled with the SCD circuitry.

7. The optical communications system of claim 6, wherein the first and second heat sink devices are separated from one another.

8. The optical communications system of claim 7, further comprising:
a baffle mechanically coupled with the optical communications system, the baffle having walls that define first and second convective air pathways that are thermally decoupled from one another, wherein the first convective air pathway flows across the parallel optical communications module and wherein the second convective air pathway flows across the second heat sink device.

9. The optical communications system of claim 5, wherein the first surface-mount structure is a printed circuit board.

10. The optical communications system of claim 9, wherein the second surface-mount structure is a land grid array (LGA) package.

11. The optical communications system of claim 10, wherein the third surface-mount structure is an interposer substrate.

12. The optical communications system of claim 11, wherein the fourth surface-mount structure is an LGA package.

13. The optical communications system of claim 5, wherein all high-speed signals that are routed between the first surface-mount structure and the parallel optical communications module are routed through the CDR circuitry.

14. The optical communications system of claim 8, wherein the CDR circuitry is pulse amplitude modulation (PAM)-N CDR circuitry, where N is a positive integer that is greater than or equal to 4.

15. An optical communications system comprising:
a parallel optical communications module, the module including a module surface-mount structure having first and second arrays of electrical contacts disposed on top and bottom surfaces thereof, respectively, a portion of the module surface-mount structure extending outside of a housing of the module;
clock and data recovery (CDR) circuitry mounted on the top surface of the module surface-mount structure that extends outside of the housing of the module; and
a baffle mechanically coupled with the optical communications system, the baffle having walls that define first and second convective air pathways that are thermally decoupled from one another.

16. The optical communications system of claim 15, further comprising:
a second surface-mount structure having third and fourth arrays of electrical contacts disposed on top and bottom surfaces thereof, respectively, the parallel optical communications module being mounted on the top surface of the second surface-mount structure, and wherein electrical contacts of the third array of electrical contacts are in contact with respective electrical contacts of the second array of electrical contacts.

17. The optical communications system of claim 16, further comprising:

a system surface-mount structure having fifth and sixth arrays of electrical contacts disposed on top and bottom surfaces thereof, respectively, the second surface-mount structure being mounted on the system surface-mount structure, and wherein electrical contacts of the fifth array of electrical contacts are in contact with respective electrical contacts of the second array of electrical contacts.

18. The optical communications system of claim 15, further comprising:

a first heat sink device mechanically and thermally coupled with the parallel optical communications module; and a second heat sink device mechanically and thermally coupled with the CDR circuitry.

19. The optical communications system of claim 18, wherein the first and second heat sink devices are separated from one another.

20. The optical communications system of claim 18, wherein the first convective air pathway flows across the parallel optical communications module and wherein the second convective air pathway flows across the second heat sink device.

21. The optical communications system of claim 20, wherein the CDR circuitry is pulse amplitude modulation (PAM)-N CDR circuitry, where N is greater than or equal to 4.

22. An optical communications system comprising:

a system surface-mount structure;

an array of parallel optical communications systems mounted on a top surface of the system surface-mount structure, each parallel optical communications system including:

a parallel optical communications module;

clock and data recovery (CDR) circuitry that is external to the respective module;

first and second heat sink devices that are in contact with the respective module and with the respective CDR circuitry, respectively; and a baffle, the baffle having walls that define first and second convective air pathways that are thermally decoupled from one another, wherein the first convective air pathway flows across the first heat sink device and wherein the second convective air pathway flows across the second heat sink device, and wherein in each column of the array, the baffles are aligned to maintain separation between the first and second convective air pathways along the respective column of the array.

* * * * *